(12) United States Patent
Wang

(10) Patent No.: US 8,686,069 B2
(45) Date of Patent: Apr. 1, 2014

(54) SOLVENT RESISTANCE OF EPOXY RESINS TOUGHENED WITH POLYETHERSULFONE

(75) Inventor: Yen-Seine Wang, San Ramon, CA (US)

(73) Assignee: Hexcel Corporation, Dublin, CA (US)

(*) Notice: Subject to any disclaimer, the term of this patent is extended or adjusted under 35 U.S.C. 154(b) by 197 days.

(21) Appl. No.: 12/902,312

(22) Filed: Oct. 12, 2010

(65) Prior Publication Data

US 2012/0088864 A1 Apr. 12, 2012

(51) Int. Cl.
*C08L 63/00* (2006.01)
*C08K 7/04* (2006.01)
*C08L 81/06* (2006.01)
*C08G 59/32* (2006.01)

(52) U.S. Cl.
USPC ........... 523/427; 523/428; 523/433; 523/468; 525/423; 525/524; 525/526; 525/528

(58) Field of Classification Search
USPC .......... 525/423, 435, 452, 453, 461, 523–535
See application file for complete search history.

(56) References Cited

U.S. PATENT DOCUMENTS

| | | | |
|---|---|---|---|
| 4,414,269 A | 11/1983 | Lubowitz et al. | |
| 4,780,507 A * | 10/1988 | Gaku et al. | 525/113 |
| 4,904,760 A * | 2/1990 | Gaku et al. | 528/422 |
| 5,025,045 A * | 6/1991 | Gawin et al. | 523/440 |
| 5,045,609 A * | 9/1991 | Lee et al. | 525/438 |
| 5,605,745 A * | 2/1997 | Recker et al. | 442/175 |
| 5,834,537 A | 11/1998 | Gotro et al. | |
| 6,046,257 A * | 4/2000 | Oosedo et al. | 523/428 |
| 6,596,373 B1 * | 7/2003 | Kishi et al. | 428/116 |
| 7,754,322 B2 | 7/2010 | Tilbrook et al. | |
| 7,968,179 B2 * | 6/2011 | Tilbrook et al. | 428/297.4 |
| 7,972,686 B2 * | 7/2011 | Tilbrook et al. | 428/297.4 |
| 8,021,752 B2 * | 9/2011 | Honda et al. | 428/413 |
| 2003/0044588 A1 | 3/2003 | Komoto et al. | |
| 2005/0277743 A1 * | 12/2005 | Nozaki | 525/403 |
| 2006/0093824 A1 * | 5/2006 | Nozaki | 428/411.1 |
| 2008/0081170 A1 * | 4/2008 | Tilbrook et al. | 428/292.1 |
| 2008/0160860 A1 * | 7/2008 | Kuroki et al. | 442/370 |
| 2008/0166511 A1 * | 7/2008 | Honma et al. | 428/36.4 |
| 2008/0286578 A1 * | 11/2008 | Tilbrook et al. | 428/413 |
| 2009/0110938 A1 * | 4/2009 | Nishimura et al. | 428/425.8 |
| 2009/0130379 A1 * | 5/2009 | Kousaka et al. | 428/116 |
| 2009/0162653 A1 * | 6/2009 | Sakata et al. | 428/367 |
| 2009/0267263 A1 * | 10/2009 | Shibayama et al. | 264/232 |
| 2009/0311535 A1 * | 12/2009 | Tilbrook et al. | 428/417 |

(Continued)

FOREIGN PATENT DOCUMENTS

| | | |
|---|---|---|
| JP | 07-041576 A * | 2/1995 |
| JP | 2003238657 | 8/2003 |

(Continued)

OTHER PUBLICATIONS

Bucknall, et al.: Phase separation in epoxy resins containing polyethersulfone, Polymer, Elsevier Science Publishers, vol. 24, No. 5, May 1, 1983.

*Primary Examiner* — David Buttner
*Assistant Examiner* — Ha Nguyen
(74) *Attorney, Agent, or Firm* — W. Mark Bielawski; David J. Oldenkamp

(57) ABSTRACT

The solvent resistance of epoxy resins toughened with polyethersulfone is improved by using low molecular weight polyethersulfone. The resulting thermoplastic toughened epoxy resins are useful for making prepreg for aerospace applications.

20 Claims, 1 Drawing Sheet

(56) References Cited

U.S. PATENT DOCUMENTS

| | | | |
|---|---|---|---|
| 2010/0062211 A1* | 3/2010 | Kawazoe et al. | 428/116 |
| 2010/0087582 A1* | 4/2010 | Wang et al. | 524/500 |
| 2010/0087587 A1* | 4/2010 | Wang et al. | 524/538 |
| 2010/0178487 A1* | 7/2010 | Arai et al. | 428/300.1 |
| 2010/0189988 A1* | 7/2010 | Custer et al. | 428/304.4 |
| 2010/0239755 A1* | 9/2010 | Tilbrook et al. | 427/221 |

FOREIGN PATENT DOCUMENTS

| | | |
|---|---|---|
| JP | 2009092976 | 12/2009 |
| WO | 9724398 | 7/1997 |
| WO | 2006095516 | 9/2006 |

* cited by examiner

SOLVENT RESISTANCE OF EPOXY RESINS TOUGHENED WITH POLYETHERSULFONE

BACKGROUND OF THE INVENTION

1. Field of the Invention

The present invention relates generally to epoxy resins that are toughened with thermoplastic materials. Such toughened resins are used to make high performance composite parts. More particularly, the present invention is directed to increasing the resistance of such thermoplastic toughened epoxies to the crazing and cracking that can occur when the cured epoxies are exposed to solvents, such as methyl ethyl ketone (MEK).

2. Description of Related Art

Composite materials are typically composed of a resin matrix and reinforcing fibers as the two primary constituents. Resin matrices that contain one or more epoxy resins as a principal ingredient are widely used. The composite materials are often required to perform in demanding environments, such as in the field of aerospace where the physical limits and characteristics of composite parts are of critical importance.

Pre-impregnated composite material (prepreg) is used widely in the manufacture of composite parts. Prepreg is a combination of uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large effect on the structural properties of the part. Prepreg is a preferred material for use in manufacturing load-bearing or structural parts and particularly aerospace structural parts, such as wings, fuselages, bulkheads and control surfaces. It is important that these parts have sufficient strength, damage tolerance, interlaminar fracture toughness and other requirements that are routinely established for such parts.

The fiber reinforcements that are commonly used in aerospace prepreg are multidirectional woven fabrics or unidirectional tape that contains fibers extending parallel to each other. The fibers are typically in the form of bundles of numerous individual fibers or filaments that are referred to as a "tows". The fibers or tows can also be chopped and randomly oriented in the resin to form a non-woven mat. These various fiber reinforcement configurations are impregnated with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The tensile strength of a cured composite material is largely dictated by the individual properties of the reinforcing fiber and matrix resin, as well as the interaction between these two components. In addition, the fiber-resin volume ratio is an important factor. Cured composites that are under tension tend to fail through a mechanism of accumulated damage arising from multiple tensile breakages of the individual fiber filaments located in the reinforcement tows. Once the stress levels in the resin adjacent to the broken filament ends becomes too great, the whole composite can fail. Therefore, fiber strength, the strength of the resin matrix, and the efficiency of stress dissipation in the vicinity of broken filament ends all contribute to the tensile strength of a cured composite material.

In many applications, it is desirable to maximize the tensile strength property of the cured composite material. However, attempts to maximize tensile strength can often result in negative effects on other desirable properties, such as the compression performance, damage tolerance and resistance to attack by solvents. In addition, attempts to maximize tensile strength can have unpredictable effects on the viscosity, tack and out-life of the resin matrix.

The viscosity of the uncured resin is an important factor that must be taken into consideration when forming prepreg. The viscosity of the resin must be low enough to insure that the resin components can be mixed completely and then impregnated thoroughly into the reinforcing fibers. The viscosity of the resin must also be high enough to insure that the resin does not flow to any substantial degree during storage or lay-up of the prepreg. Resins that do not have viscosities which meet these basic requirements cannot be used to make prepreg. In any attempt to increase strength and/or damage tolerance of a given cured composite material, it is important that the viscosity of the uncured resin remain within acceptable limits.

The stickiness or tackiness of the uncured prepreg is commonly referred to as "tack". The tack of uncured prepreg is an important consideration during lay-up and molding operations. Prepreg with little or no tack is difficult to form into laminates that can be molded to form composite parts. Conversely, prepreg with too much tack can be difficult to handle and also difficult to place into the mold. It is desirable that the prepreg have the right amount of tack to insure easy handling and good laminate/molding characteristics. In any attempt to increase strength and/or damage tolerance of a given cured composite material, it is important that the tack of the uncured prepreg remain within acceptable limits to insure suitable prepreg handling and molding.

The "out-life" of prepreg is the length of time that the prepreg may be exposed to ambient conditions before undergoing an unacceptable degree of curing. The out-life of prepreg can vary widely depending upon a variety of factors, but is principally controlled by the resin formulation being used. The prepreg out-life must be sufficiently long to allow normal handling, lay-up and molding operations to be accomplished without the prepreg undergoing unacceptable levels of curing. In any attempt to increase strength and/or damage tolerance of a given cured composite material, it is important that the out-life of the uncured prepreg remain as long as possible to allow sufficient time to process, handle and lay up the prepreg prior to curing.

A common method of increasing composite tensile performance is to change the surface of the fiber in order to weaken the strength of the bond between matrix and fiber. This can be achieved by reducing the amount of electro-oxidative surface treatment of the fiber after graphitization. Reducing the matrix fiber bond strength introduces a mechanism for stress dissipation at the exposed filament ends by interfacial de-bonding. This interfacial de-bonding provides an increase in the amount of tensile damage a composite part can withstand before failing in tension.

Alternatively, applying a coating or "size" to the fiber can lower the resin-fiber bond strength. This approach is well known in glass fiber composites, but can also be applied to composites reinforced with carbon fibers. Using these strategies, it is possible to achieve significant increases in tensile strength. However, the improvements are accompanied by a decrease in properties, such as compression after impact (CAI) strength, which requires high bond strength between the resin matrix and fibers.

Another method of increasing composite tensile performance and resistance to damage is to include one or more thermoplastic materials in the epoxy resin matrix. A variety of different thermoplastic materials in a variety of different forms have been used to toughen epoxy resins. Thermoplastics that have been used to toughen epoxy resins include polyethersulfone (PES), polyetherimide (PEI), polyamide imide (PAI) and polyamide (PA). For example, see U.S. Pat. No. 7,754,322.

Multiple layers of prepreg are commonly used to form composite parts for structural applications that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces. The G2c interlaminar fracture toughness is related to CAI. Prepreg materials that exhibit high damage tolerances also tend have high CAI and G2c values.

The cured prepreg must also be resistant to attack by solvents and other chemicals to which the cured composite part may be exposed. A common test to determine solvent-stress interactive effects on cured resins is to strain a cured resin specimen by bending the specimen and then exposing the strained specimen to a given solvent or other chemical for a period of time, which is typically on the order of a few days or more. The specimen is checked for stress cracking and/or crazing at various times during the test period. The specimens are typically strained in bending from 0% to about 2%. The strain varies proportionally to the arc length of the specimen, which is a characteristic of a clothoid curve (spiral). The test apparatus used to induce the clothoid curve to the specimen is known as a "clothoid strain jig". Use of the clothoid stain jig allows a single test specimen to be bent so as to provide strains over the entire test range.

Resin specimens are considered to be highly resistant to attack by a given solvent if they do not exhibit any cracks when subjected up to a 2% maximum strain in a clothoid strain jig and exposed to the solvent for 7 days at room temperature. In order to be suitable for use in aerospace applications, the cured epoxy resins must be highly resistant to attack by solvents to which the resin may be exposed. It is important that measures taken to strengthen and/or toughen an epoxy resin do not inadvertently reduce the resins resistance to attack by solvents.

Although many existing prepregs are well suited for their intended use in providing composite parts that are strong and damage tolerant, there still is a continuing need to provide prepreg that may be used to make composite parts for structural applications that have high levels of strength (e.g. compression strength), high damage tolerance (CAI) and interlaminar fracture toughness (G1c and G2c) and which exhibit a high resistance to attack by solvents.

SUMMARY OF THE INVENTION

In accordance with the present invention uncured resins are provided that are suitable for use in aerospace applications where high levels of strength, damage tolerance and interlaminar toughness are required. The invention is applicable to multi functional epoxy resins that include polyethersulfone (PES) alone or in combination with other thermoplastic toughening agents. The invention is based, at least in part, on the discovery that low molecular weight PES, when used as a thermoplastic toughener, causes a significant increase in the ability of such thermoplastic-toughened epoxies to resist attack by solvents.

The present invention covers uncured resins that include an epoxy resin component made up of a di functional epoxy resin, tri functional epoxy resin and/or tetra functional epoxy resin. The uncured resin further includes a thermoplastic component that includes low molecular weight PES, either alone or in combination with one or more other thermoplastic tougheners. The invention also covers the uncured resin in combination with a curative component and/or a fiber reinforcement as well as the cured combinations of resin and fiber reinforcement that are suitable for use as at least part of a primary structure of an aircraft.

Prepreg and the methods for making prepreg using multi functional epoxy resins that are toughened with low molecular weight PES are also part of the present invention. The prepreg is suitable for use in fabricating cured composite parts that are highly resistant to solvent attack and which are otherwise suitable for use as at least part of a primary structure of an aircraft.

The above described and many other features and attendant advantages of the present invention will become better understood by reference to the following detailed description when taken in conjunction with the accompanying drawings.

DETAILED DESCRIPTION OF THE INVENTION

Uncured matrix resin compositions in accordance with the present invention may be used in a wide variety of situations where a thermoplastic-toughened epoxy resin is desired. Although the uncured epoxy resin compositions may be used alone, the compositions are generally combined with a fibrous support to form composite materials. The composite materials may be in the form of a prepreg, partially cured prepreg or a completely cured final part. The term "uncured", when used herein in connection with prepreg, matrix resin or composite material, is intended to cover items that may have been subjected to some curing, but which have not been completely cured to form the final composite part or structure.

Although the composite materials may be used for any intended purpose, they are preferably used in aerospace vehicles and particularly preferred for use in civilian and military aircraft. For example, the composite materials may be used to make non-primary (secondary) aircraft structures. However the preferred use of the composite material is for structural applications, such as primary aircraft structures. Primary aircraft structures or parts are those elements of either fixed-wing or rotary wing aircraft that undergo significant stress during flight and which are essential for the aircraft to maintain controlled flight. The composite materials may also be used for other structural applications to make load-bearing parts and structures in general.

Figure 1:
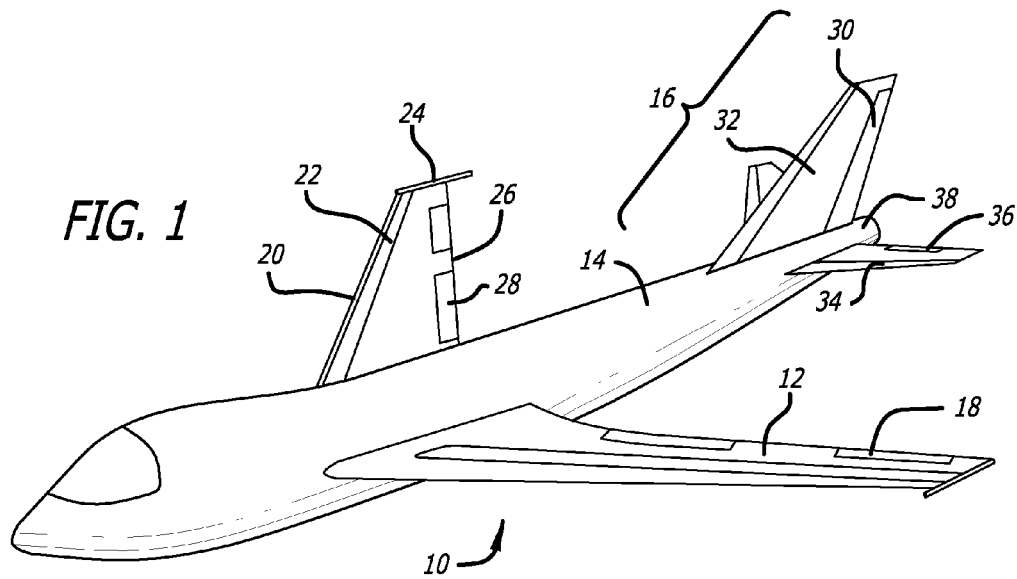
FIG. 1 is a perspective view of an aircraft, which depicts exemplary primary aircraft structures that can be made using composite materials in accordance with the present invention.
Figure 2:
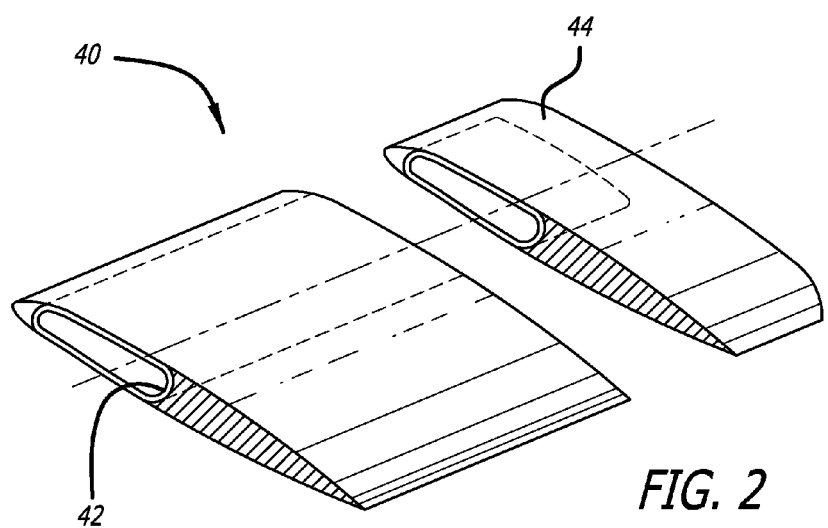
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The uncured resin and pre-impregnated composite materials (prepreg) of the present invention may be used as replacements for existing uncured resin and/or prepreg that are being used to form composite parts in the aerospace industry and in any other structural applications where high strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes that are suitable for thermoplastic-toughened epoxy resins.

Pre-impregnated composite materials in accordance with the present invention are composed of reinforcing fibers and an uncured resin matrix. The reinforcing fibers can be any of the conventional fiber configurations that are used in the prepreg industry. The uncured resin matrix includes an epoxy resin component that includes di functional, tri functional and tetra functional aromatic epoxy resins either alone or in combination. Epoxy resin components made up of a combination of tri functional and tetrafunctional epoxy resins are preferred. The resin matrix further includes a thermoplastic component that is composed of low molecular weight PES, either alone or in combination with one or more other thermoplastic agents. A curative component that contains one or more curing agents may be included directly in the resin formulation or it may be added just prior to or during the curing process. For example, the curative component may be located within or adjacent to the reinforcing fibers at a location separate from the epoxy resin for mixing to form the resin matrix during the curing/molding process.

As will be discussed in detail below, a feature of the present invention is the discovery that the use of low molecular weight PES in the thermoplastic component produces cured composite materials that are highly resistant to attack by solvents, such a MEK.

The epoxy resin component is preferably composed of one or more tri functional epoxy resins and/or tetra functional epoxy resins. Preferred is a combination of trifunctional and tetrafunctional epoxy resins. The multi functional epoxy resins may be saturated, unsaturated, cylcoaliphatic, alicyclic or heterocyclic. Suitable multi functional epoxy resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof. The epoxy resin component should make up from 40 to 65 weight percent of the matrix resin.

A tri functional epoxy resin will be understood as having the three epoxy groups substituted either directly or indirectly in a para or meta orientation on the phenyl ring in the backbone of the compound. The meta orientation is preferred. A tetra functional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetra functional epoxy resins include, N'N,N,N-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morristown, N.J.). Suitable tri functional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

A preferred tri functional epoxy resin is triglycidyl meta-aminophenol. Triglycidyl meta-aminophenol is available commercially from Huntsman Advanced Materials (Monthey, Switzerland) under the trade names Araldite MY0600 or MY0610 and from Sumitomo Chemical Co. (Osaka, Japan) under the trade name ELM-120.

Additional examples of suitable multi functional epoxy resin include N,N,N',N'-tetraglycidyl-4,4'-diaminodiphenyl methane (TGDDM available commercially as Araldite MY720 and MY721 from Huntsman Advanced Materials (Monthey, Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl) and methane-based epoxy resin such as Tactix 742 (available commercially from Huntsman Advanced Materials). Other suitable multi-functional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials). TGDDM (MY720 or MY721) is a preferred tetra functional epoxy.

The epoxy component may also include di functional epoxy resins, such as Bisphenol-A (Bis-A) or Bisphenol-F (Bis-F) epoxy resin. Exemplary Bis-A epoxy resin is available commercially as Araldite GY6010 (Huntsman Advanced Materials) or DER 331, which is available from Dow Chemical Company (Midland, Mich.). Exemplary Bis-F epoxy resin is available commercially as Araldite GY281 and GY285 (Huntsman Advanced Materials). The amount of Bis-A or Bis-F epoxy resin present in the epoxy resin component may be varied. It is preferred that no more than 20 weight percent of the epoxy resin component be difunctional epoxy resin. The epoxy resin component preferable contains more tri functional epoxy and tetra functional epoxy with the preferred weight ratio of tri functional to tetra functional epoxy resin ranging from 2.0:1 to 2.4:1.

It is preferred that the resin matrix include little, if any, difunctional epoxy. The resin matrix preferably includes from 20 to 40 weight percent of tri functional epoxy resin and 10 to 30 weight percent tetra functional epoxy resin. More preferred is a resin matrix that contains from 30 to 40 weight percent of trifunctional epoxy resin and 10 to 20 weight percent tetra functional epoxy resin. A combination of triglycidyl meta-aminophenol (MY0600 or MY0610) with TGDDM (MY720 or MY721) is particularly preferred. It should be noted that the weight percentages of the various ingredients listed herein that are based on the weight of the resin matrix are to be calculated based on the weight of a resin matrix that includes the epoxy resin component, thermoplastic component, curing agent and additives, if any.

As a feature of the invention, the uncured resin matrix includes a thermoplastic component that is composed of low molecular weight PES alone or in combination with one or more thermoplastic materials that may be soluble or insoluble in the epoxy resin. It is preferred that the thermoplastic component includes a combination of soluble and insoluble thermoplastic materials.

Low molecular weight PES, as used herein means PES that has a molecular weight (g/mole) of between 10,000 and 30,000. Preferably, the low molecular weight PES will have a molecular weight of 15,000 to 25,000. Most preferred is low molecular weight PES having a molecular weight of about 21,000. Low molecular weight PES is available commercially from a number of sources. For example, PES having a molecular weight of about 21,000 g/mole is available from Solvay Advanced Polymers (Greenville, S.C.) under the trade name VW-10700RP. The invention involves improving the solvent-resistance of a thermoplastic toughened epoxy resin by substituting low molecular weight PES in place of the high molecular weight PES that is conventionally used in the thermoplastic components. The standard high molecular weight PES is sold under the trade name Sumikaexcel 5003P, which is commercially available from Sumitomo Chemicals. Alternatives to 5003P are Solvay polyethersulphone 105RP or VW-10200RP or the non-hydroxyl terminated grades such as Solvay 1054P (Solvay Advanced Polymers—Greenville, S.C.). The molecular weight of 5003P and VW-10200RP is about 46,500 g/mole. For the purposes of this specification, high molecular weight PES is any PES that has a molecular weight of over 30,000 g/mole.

For any given thermoplastic component, it is preferred that substantially the entire amount of PES (at least 95 weight percent) be in the form of low molecular weight PES. However, it is possible to replace only a portion of the higher molecular weight PES with low molecular weight PES, provided that the desired increase in solvent resistance is obtained. It is preferred that at least 50 weight percent of the PES is in the form of low molecular weight PES. More preferably, at least 80 weight percent of the PES present in the thermoplastic component should be low molecular weight PES.

PES is a thermoplastic that is considered to be soluble in epoxy resins. Other exemplary soluble epoxy resins that can be used in combination with PES include polyetherimide (PEI) and polysulphone (PS). Typically, the thermoplastic polymer(s) are added to the resin mix as particles that are dissolved in the resin mixture by heating prior to addition of the insoluble particles and curing agent. Once the thermoplastic polymer is substantially dissolved in the hot matrix resin precursor (i.e. the blend of epoxy resins), the precursor is cooled and the remaining ingredients (curing agent, if included, insoluble thermoplastic(s) and/or any other additives) are added.

It is preferred that the uncured resin matrix include from 10 to 20 weight percent the soluble thermoplastic material. More preferred is an uncured resin matrix that contains from 12 to 18 weight percent soluble thermoplastic material. Most preferred is a resin matrix that contains from 13 to 15 weight percent soluble thermoplastic material. It is preferred that the majority of the soluble thermoplastic (at least 80 weight percent) in the thermoplastic component be PES and that substantially the entire amount of PES be in the form of low molecular weight PES. Most preferred is a resin matrix where substantially all (at least 95 weight percent) of the soluble thermoplastic in the thermoplastic component is low molecular weight PES.

The thermoplastic component also preferably includes insoluble thermoplastic particles. These particles do not dissolve during the curing process and remain within the interlayer zones of the cured composite material. The amount of insoluble particles in the uncured resin matrix is preferably from 5 to 20 weight percent. More preferred are resin matrices that contain from 6 to 18 weight percent insoluble particles. Most preferred are resin matrices that contain from 8 to 12 weight percent insoluble particles.

Examples of suitable thermoplastic particles include polyamideimide (PAI) particles and polyamide (PA) particles. The thermoplastic particles have glass transition temperatures ($T_g$) that are above room temperature (22° C.).

Polyamide particles come in a variety of grades that have different melting temperature ranges depending upon the particular polyamide and the molecular weight of the polyamide. Polyamide particles in accordance with the present invention have melting temperature ranges of above 170° C. and below 240° C. It is preferred that the polyamide particles have a Young's modulus of between 200 and 400 ksi with a modulus of about 300 ksi being particularly preferred.

Suitable polyamide particles contain polyamide 6 (caprolactame-PA6) as the main ingredient, but may also contain minor amounts of polyamide 12 (laurolactame-PA12) and/or polyamide 11. The particles should have particle sizes of below 100 microns. It is preferred that the particles range in size from 5 to 60 microns and more preferably from 10 to 30 microns. It is preferred that the average particle size be around 20 microns. The particles should be substantially spherical. The particles can be made by anionic polymerization in accordance with PCT application WO2006/051222, by co-extrusion, precipitation polymerization, emulsion polymerization or by cryogenic grinding. Suitable polyamide particles are available commercially from Arkema of France under the trade name Orgasol.

Orgasol 1002 D NAT1 is an example of a suitable polyamide particle. Orgasol 1002 D NAT1 is composed of 100% PA6. The Young's modulus of Orgasol 1002 D NAT1 particles is about 300 ksi. The particles having a degree of crystallinity equal to 51%, a glass transition temperature (Tg) of 26° C., a density of 1.15 (ISO 1183), a molecular weight of 60,200 (g/mole) with a melting point of 217° C. and an average particle size of 20 microns. Another example of a suitable rigid particle is Orgasol 3202 D Nat 1 which contains PA6/PA12 copolymer particles (80% PA6 and 20% PA12) having a degree of crystallinity equal to 43%, a Tg of 29° C., a density of 1.09 (ISO 1183), a molecular weight of 60,800 (g/mole) and a solution viscosity of 1.01. The polyamide copolymer particles in Orgasol 3202 D Nat 1 have an average particle size of 20 microns and a melting point of 194° C. The amount of PA12 in the copolymer may be increased above 20%.

It is preferred that the resin matrix include PA particles and that the amount of PA particles be in the range of 1 to 10 weight percent of the total resin matrix. More preferred are PA particle amounts in the range of 2-8 weight percent.

Suitable PAI particles are available commercially as TORLON 4000T or TORLON 4000TF from Solvay Advanced Polymers (Alpharetta, Ga.). The preferred average particle size range for the PAI particles is from 8 microns to 20 microns. PAI particles have a Young's modulus of about 600 ksi. It is preferred that the resin matrix include PAI particles and that the amount of PAI particles be in the range of 5 to 15 weight percent of the total resin matrix. More preferred are PAI particle amounts in the range of 4-10 weight percent. A preferred thermoplastic component includes both PAI and PA particles. The preferred weight ratios of PAI to PA particles ranges from 2:1 to 4:1 with weight ratios of between about 2.8:1 and 3.8:1 being particularly preferred.

The uncured resin may also include elastic particles in amounts of up to 10 weight percent of the resin matrix. Preferred amounts of elastic particles range from 5 to 9 weight percent of the resin matrix. Suitable elastic particles include particles that are composed principally of polyurethane. The elastic particles preferably contain at least 95 weight percent polyurethane polymer. Other elastic particles that are composed of a high molecular weight elastomer that is insoluble in epoxy may also be used. The Young's modulus of elastic particles should be below 10 ksi. The $T_g$ of elastic particles should be at room temperature (22° C.) or below Polyurethane particles that contain a small amount (less than 5 weight percent) of silica are a preferred type of elastic particle. Polyurethane particles that are available from Aston Chemicals (Aylesbury, UK) under the trade name SUNPU-170 are a preferred type of polyurethane particle. SUNPU-170 is composed of HDI/Trimethylol Hexyllactone Crosspolymer, Silica. The particles contain about 95 to 99 weight percent urethane polymer and 1 to 5 weight percent silica. The particles are microspheres that range in diameter from 5 microns to 20 micron. Suitable polyurethane particles are also available from Kobo Products (South Plainfield, N.J.) under the trade name BPD-500, BP-500T and BP-500W. These particles are also composed of HDI/Trimethylol hexyllactone Crosspolymer and silica. The particles are also microspheres that range in size from 10 microns to 15 microns. The BPD-500 microspheres contain from 1 to 3 weight percent silica and from 97 to 99 weight percent polyurethane.

The particle sizes and relative amounts of the insoluble thermoplastic particles and elastic particles are selected so that not only are the desired levels of OHC, CAI, G1c and G2c achieved, but also so that the viscosity of the epoxy resin composition is within a range that is suitable for prepreg preparation. It is preferred that the viscosity of the resin be the same as the viscosity of existing high performance toughened resins that are presently used in the aerospace industry to make prepreg including quasi-isotropic chopped prepreg. In order to achieve the desired combination of uncured resin properties and cured composite properties in accordance with the present invention, it is preferred that the thermoplastic component contains at least two different types of insoluble thermoplastic particles in the amounts described herein.

Using low molecular weight PES in place of the standard higher molecular weight PES is also useful in reducing the viscosity of resin matrix. It was discovered that using low molecular weight PES helps keep the viscosity of the uncured resin within acceptable limits for prepreg preparation. This is especially the case for uncured resins that contain amounts of thermoplastic materials which are toward the higher end of the acceptable range and/or where elastic particles are included as part of the resin mix.

The amount of curative agent component that is combined with the epoxy resin component and thermoplastic component is from 10 to 45 weight percent of the total weight of the epoxy resin matrix. Exemplary curative agents in accordance with the present invention include dicyandiamide, methylenedianiline (MDA), m-phenylenediamine (MPDA), 4,4'-methylenebis(2,6-diethylaniline), 3,3'-diaminodiphenyl sulfone (3,3'-DDS), 4,4'-diaminodiphenyl sulfone (4,4'-DDS) and 4,4'-Bis (p-aminophenoxy) biphenyl (BAPB). 3,3'-DDS and 4,4'-DDS are preferred curative agents that may be used alone or in combination. It is particularly preferred that the curative component be composed substantially (at least 95 weight percent) of 3,3'-DDS in amounts ranging from 15.0 to 25.0 weight percent of the matrix resin.

BAPB is also a preferred curing agent. The amount of BABP included in the resin matrix will depend on the amount and type of epoxies present. The amount of BAPB should be sufficient to insure complete curing of the uncured resin. This amount can be calculated based on the functionality and amount of each epoxy resin in the formulation. The amount of BAPB needed to provide complete cure will be between 15 and 45 weight percent of the total uncured resin. Preferred amounts of BAPB are between 30 and 40 weight percent of the matrix resin.

One or more cure accelerators may be included in the epoxy resin matrix provided that the solvent resistance of the cured resin is not adversely affected. In addition, the amount of accelerator used must not adversely affect other properties of the uncured resin, such as viscosity and tack, so as to make the resin difficult to use in forming prepreg. Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa). The amount of accelerator present in the epoxy resin composition, if any, should be kept below 2 weight percent of the total composition. The use of a catalyst is not preferred.

The uncured resin may also include additional ingredients, such as performance enhancing or modifying agents and additional thermoplastic polymers provided they do not adversely affect the viscosity, tack and out-life of the prepreg or the strength, damage tolerance and resistance to solvents of the cured composite part. The performance enhancing or modifying agents, for example, may be selected from flexibilizers, additional thermoplastic polymers, accelerators, core shell rubbers, flame retardants, wetting agents, pigments/dyes, UV absorbers, anti-fungal compounds, fillers, conducting particles, and viscosity modifiers. Suitable additional thermoplastic polymers include any of the following, either alone or in combination: polyether ethersulphone (PEES), polyphenyl sulphone, polyimide, aramid, polyester, polyketone, polyetheretherketone (PEEK), polyurea, polyarylether, polyarylsulphides, polycarbonates, polyphenylene oxide (PPO) and modified PPO.

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon particles, carbon nanotubes and carbon nanofibers. Metal-coated fillers may also be used, for example nickel coated carbon particles and silver coated copper particles.

The uncured resin matrix may include, if desired, an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, bismaleimide, vinyl ester, benzoxazine and phenolic resins. If desired, the matrix may include further suitable resins containing phenolic groups, such as resorcinol based resins, and resins formed by cationic polymerization, such as DCPD-phenol copolymers. Still additional suitable resins are melamine-formaldehyde resins, and urea-formaldehyde resins.

The uncured resin matrix is made in accordance with standard prepreg processing. In general, the various epoxy resins are mixed together at room temperature to form a resin mix to which the thermoplastic component is added. This mixture is then heated to a temperature above the melting point of the thermoplastic(s) in the thermoplastic component for a sufficient time to substantially melt the thermoplastic(s). The mixture is then cooled down to room temperature or below and the insoluble thermoplastic particles, curing curative component and other additives, if any, are then mixed into the resin to form the final uncured resin matrix that is impregnated into the fiber reinforcement. As mentioned previously, in some applications, the curative component is located separately from the rest of the components until the molding/curing process.

The uncured resin matrix is applied to the fibrous reinforcement in accordance with any of the known prepreg manufacturing techniques. The fibrous reinforcement may be fully or partially impregnated with the uncured resin. In an alternate embodiment, the uncured resin may be applied to the fiber fibrous reinforcement as a separate film or layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, tow-pregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred uncured resin matrix includes from 30 to 40 weight percent triglycidyl-m-aminophenol (tri functional epoxy resin); from 10 to 20 weight percent tetra functional para-glycidyl amine (tetra functional epoxy resin); from 10 to 20 weight percent low molecular weight polyethersulfone; from 5 to 15 weight percent polyamideimide (insoluble thermoplastic particle); from 1 to 5 weight percent polyamide particles (insoluble thermoplastic particle); and from 15 to 25 weight percent 3,3'-DDS (curative component). An alternate preferred embodiment additionally contains from 5.0 to 9.0 weight percent polyurethane particles.

A particularly preferred uncured resin matrix includes about 32 to 36 weight percent triglycidyl-m-aminophenol (tri functional epoxy resin); about 14 to 16 weight percent tetra functional para-glycidyl amine (tetra functional epoxy resin); about 13 to 16 weight percent low molecular weight polyethersulfone (soluble thermoplastic); about 9 to 11 weight percent polyamideimide (insoluble thermoplastic particle); about 2 to 4 weight percent polyamide particles (insoluble thermoplastic particle); and about 18 to 20 weight percent 3,3'-DDS (curative component).

Another preferred uncured resin matrix includes about 23 to 25 weight percent triglycidyl-m-aminophenol (tri functional epoxy resin); about 23 to 25 weight percent tetra functional para-glycidyl amine (tetra functional epoxy resin); about 16 to 18 weight percent low molecular weight polyethersulfone (soluble thermoplastic); and about 33 to 36 weight percent BAPB (curative component).

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The uncured composite material may also be cured using a method selected from UV-visible radiation, microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful for other high performance structural applications in the automotive, rail, marine and energy industries where high tensile strength, compressive strength, interlaminar fracture toughness and resistance to impact damage are needed.

It was discovered that the cured resin which contain low molecular weight PES in accordance with the present invention are highly resistant to attack by MEK. When strained and immersed in MEK at room temperature for 7 days, the cured resins exhibit no cracking and exhibit visible crazing only above 1.0 percent strain. In view of the cured resins high resistance to attack by MEK, it is expected that the cured resins will also be highly resistant to attack by other ketone type solvents, such as acetone. The cured resins will also be highly resistant to less aggressive solvents to which the cured resins might be exposed during use as part of an aircraft. Such potential solvents include hydraulic fluid, jet, gasoline, alcohols and organic solvents.

In order that the present invention may be more readily understood, reference will now be made to the following examples of the invention.

EXAMPLE 1

A preferred exemplary resin formulation in accordance with the present invention is set forth in TABLE 1. A matrix resin was prepared by mixing the epoxy ingredients at room temperature with the low molecular weight polyethersulfone to form a resin blend that was heated to 130° C. for 60 minutes to completely dissolve the low molecular weight polyethersulfone. The mixture was cooled to 80° C. and the rest of the ingredients (polyamideimide particles, polyamide particles and curing agent) were added and mixed in thoroughly to form the uncured resin.

TABLE 1

| Amount (Wt %) | Ingredient |
| --- | --- |
| 35.5 | Trifunctional meta-glycidyl amine (MY0610) |
| 16.0 | Tetrafunctional para-glycidyl amine (MY721) |
| 15.0 | Low MW PES (VW-10700RP) |
| 10.8 | Polyamideimide (Torlon 4000TF) |
| 3.2 | Polyamide particles (Orgasol 1002 D Nat 1) |
| 19.5 | 3,3'-diaminodiphenyl sulphone (3,3'-DDS) |

The uncured resin had a viscosity that was suitable for use in making prepreg. When impregnated into fiber reinforcement, the resulting prepreg will have tack and out-life properties that are acceptable for use in forming articles for molding. Exemplary prepreg can be prepared by impregnating one or more layers of unidirectional carbon fibers with the resin formulation of TABLE 1. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours. The resulting composite parts have strength, damage tolerance properties and interlaminar fracture toughness that make them suitable for use in primary structures on aircraft.

A specimen for solvent resistance testing was prepared using the resin formulation of TABLE 1. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature for a period of 7 days. After 7 days, the test specimen only exhibited crazing above the 1.29% strain location on the test specimen.

Comparative Example 1

A comparative resin having the formulation set forth in TABLE 2 was prepared in the same manner as EXAMPLE 1. The resin is the same as the resin in Example 1, except that low molecular PES has been replaced with high molecular weight PES.

TABLE 2

| Amount (Wt %) | Ingredient |
| --- | --- |
| 35.5 | Trifunctional meta-glycidyl amine (MY0610) |
| 16.0 | Tetrafunctional para-glycidyl amine (MY721) |
| 15.0 | High MW PES (Sumikaexcel 5003P) |
| 10.8 | Polyamideimide (Torlon 4000TF) |
| 3.2 | Polyamide particles (Orgasol 1002 D Nat 1) |
| 19.5 | 3,3'-diaminodiphenyl sulphone (3,3'-DDS) |

A specimen for solvent resistance testing was prepared using the resin formulation of TABLE 2. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature and cracked in 10 seconds.

EXAMPLE 2

An exemplary resin formulation in accordance with the present invention is set forth in TABLE 3. A matrix resin was prepared by mixing the epoxy ingredients at room temperature with the polyethersulfone to form a resin blend that was heated to 130° C. for 60 minutes to completely dissolve the polyethersulfone. The mixture was cooled to 80° C. and the rest of the ingredients (polyamideimide particles, polyamide particles, polyurethane particles and curing agent) were added and mixed in thoroughly to form the uncured resin.

TABLE 3

| Amount (Wt %) | Ingredient |
| --- | --- |
| 33.0 | Trifunctional meta-glycidyl amine (MY0610) |
| 15.0 | Tetrafunctional para-glycidyl amine (MY721) |
| 14.0 | Low MW PES (VW-10700RP) |
| 7.0 | Polyurethane (SUNPU-170) |
| 10.0 | Polyamideimide (Torlon 4000TF) |
| 3.0 | Polyamide particles (Orgasol 1002 D Nat 1) |
| 18.1 | 3,3'-diaminodiphenyl sulphone (3,3'-DDS) |

The uncured resin had a viscosity that was suitable for use in making prepreg. When impregnated into fiber reinforcement, the resulting prepreg will have tack and out-life properties that are acceptable for use in forming articles for molding. Exemplary prepreg can be prepared by impregnating one or more layers of unidirectional carbon fibers with the resin formulation of TABLE 3. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours. The resulting composite parts have strength, damage tolerance properties and interlaminar fracture toughness that make them suitable for use in primary structures on aircraft.

A specimen for solvent resistance testing was prepared using the resin formulation of TABLE 3. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature for a period of 7 days. After 7 days, the test specimen only exhibited crazing beginning at the 1.08% strain location on the test specimen.

Comparative Example 2

A comparative resin having the formulation set forth in TABLE 4 was prepared in the same manner as EXAMPLE 2. The resin is equivalent to the resin in Example 2, except that, low molecular PES has been replaced with high molecular weight PES.

TABLE 4

| Amount (Wt %) | Ingredient |
| --- | --- |
| 33.0 | Trifunctional meta-glycidyl amine (MY0610) |
| 15.0 | Tetrafunctional para-glycidyl amine (MY721) |
| 14.0 | High MW PES (Sumikaexcel 5003P) |
| 7.0 | Polyurethane (SUNPU-170) |
| 10.0 | Polyamideimide (Torlon 4000TF) |
| 3.0 | Polyamide particles (Orgasol 1002 D Nat 1) |
| 18.0 | 3,3'-diaminodiphenyl sulphone (3,3'-DDS) |

A specimen for solvent resistance testing was prepared using the resin formulation of TABLE 4. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature and cracked in less than 10 minutes.

EXAMPLE 3

An exemplary resin formulation in accordance with the present invention is set forth in TABLE 5. Uncured resin was prepared by mixing the epoxy ingredient at room temperature with the polyethersulfone (PES) to form a resin blend that was heated to 130° C. for 60 minutes to completely dissolve the PES. The mixture was cooled to 80° C. and BAPB, as the curing agent, was added and mixed in thoroughly to form the uncured resin.

TABLE 5

| Amount (Wt %) | Ingredient |
| --- | --- |
| 24.3 | Trifunctional para-glycidyl amine (MY0510) |
| 24.3 | Tetrafunctional para-glycidyl amine (MY721) |
| 17.0 | Low MW PES (VW-10700RP) |
| 34.4 | 4,4'-Bis (p-aminophenoxy) biphenyl (BAPB) |

The uncured resin had a viscosity that was suitable for use in making prepreg. When impregnated into fiber reinforcement, the resulting prepreg will have tack and out-life properties that are acceptable for use in forming articles for molding. Exemplary prepreg can be prepared by impregnating one or more layers of unidirectional carbon fibers with the resin formulation of TABLE 5. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours. The resulting composite parts have strength, damage tolerance properties and interlaminar fracture toughness that make them suitable for use in primary structures on aircraft.

A specimen for solvent resistance testing was prepared using the resin formulation of TABLE 5. The resin was formed into a specimen that was 4.5 inches (11.4 cm) long, 0.5 inch (1.3 cm) wide and 0.63 inch (0.16 cm) thick. The resin was cured in an autoclave at 180° C. for about 2 hours to form a cured test specimen. The test specimen was strained in a standard clothoid test jig to provide strains ranging from 0% to a maximum of 2%. The strained test specimen was immersed in MEK at room temperature for a period of 7 days. After 7 days, the test specimen exhibited no crazing or cracking. It is preferred that low molecular weight PES be used in combination with BAPB in view of the particularly high solvent resistance that is achieved by this combination, as demonstrated by this example.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An uncured thermoplastic-toughened epoxy resin which, when cured, is resistant to solvent-induced cracking, said uncured thermoplastic-toughened epoxy resin comprising:
   an epoxy resin component comprising from 30 to 40 weight percent of a tri functional epoxy resin and from 10 to 20 weight percent of a tetra functional epoxy resin, based on the total weight of said uncured thermoplastic-toughened epoxy resin;
   a thermoplastic component comprising from 10 to 20 weight percent of a low molecular weight polyethersulfone, from 5 to 15 weight percent of polyamideimide and from 1 to 5 weight percent of polyamide particles, based on the total weight of said uncured thermoplastic-toughened epoxy resin, wherein the molecular weight of said low molecular weight polyethersulfone is between 10,000 and 30,000 g/mole and wherein the amount of said low molecular weight polyethersulfone in said thermoplastic component is sufficient to provide said uncured thermoplastic-toughened epoxy resin, when cured, with said resistance to solvent-induced cracking; and
   a curative component comprising from 15 to 25 weight percent of a curing agent, based on the total weight of said uncured thermoplastic-toughened epoxy resin.

2. An uncured thermoplastic-toughened epoxy resin according to claim 1 which comprises:
   an epoxy resin component comprising from 32 to 36 weight percent of said tri functional epoxy resin and from 14 to 26 weight percent of said tetra functional epoxy resin, based on the total weight of said uncured thermoplastic-toughened epoxy resin;

a thermoplastic component comprising from 13 to 16 weight percent of a low molecular weight polyethersulfone, from 9 to 11 weight percent of polyamideimide and from 2 to 4 weight percent of polyamide particles, based on the total weight of said uncured thermoplastic-toughened epoxy resin, wherein the amount of polyethersulfone in said thermoplastic component is sufficient to provide said uncured thermoplastic-toughened epoxy resin, when cured, with said resistance to solvent-induced cracking; and a curative component comprising from 18 to 20 weight percent of a curing agent, based on the total weight of said uncured thermoplastic-toughened epoxy resin.

3. An uncured thermoplastic-toughened epoxy resin according to claim 1 which comprises an elastic particle component comprising from 5 to 9 weight percent polyurethane particles, based on the total weight of said uncured thermoplastic-toughened epoxy resin.

4. An uncured thermoplastic-toughened epoxy resin according to claim 2 which comprises an elastic particle component comprising from 5 to 9 weight percent polyurethane particles, based on the total weight of said uncured thermoplastic-toughened epoxy resin.

5. An uncured thermoplastic-toughened epoxy resin according to claim 1 wherein said tri functional epoxy resin is a tri functional meta-glycidyl amine.

6. An uncured thermoplastic-toughened epoxy resin according to claim 2 wherein said tri functional epoxy resin is a tri functional meta-glycidyl amine.

7. An uncured thermoplastic-toughened epoxy resin according to claim 5 wherein said tetra functional epoxy resin is a tetra functional para-glycidyl amine.

8. An uncured thermoplastic-toughened epoxy resin according to claim 6 wherein said tetra functional epoxy resin is a tetra functional para-glycidyl amine.

9. An uncured thermoplastic-toughened epoxy resin according to claim 1 wherein the molecular weight of said low molecular weight polyethersulfone is between 15,000 and 25,000 g/mole.

10. An uncured thermoplastic-toughened epoxy resin according to claim 1 wherein the molecular weight of said low molecular weight polyethersulfone is between 15,000 and 25,000 g/mole.

11. An uncured thermoplastic-toughened epoxy composite material comprising an uncured thermoplastic-toughened epoxy resin according to claim 1 and a fiber reinforcement.

12. A composite part comprising an uncured thermoplastic-toughened epoxy composite material according to claim 11 wherein said uncured thermoplastic-toughened epoxy resin has been cured.

13. A composite part according to claim 12 wherein said composite part forms at least part of a primary structure of an aircraft.

14. A method for making a prepreg, said method comprising the steps of:

providing an uncured thermoplastic-toughened epoxy resin according to claim 1; and combining said uncured thermoplastic-toughened epoxy resin with a fibrous reinforcement to provide said prepreg.

15. A method for making a prepreg according to claim 14 wherein said uncured thermoplastic-toughened epoxy resin comprises an elastic particle component comprising from 5 to 9 weight percent polyurethane particles, based on the total weight of said uncured thermoplastic-toughened epoxy resin.

16. A method for making a prepreg according to claim 14 wherein said tri functional epoxy resin is a tri functional meta-glycidyl amine.

17. A method for making a prepreg according to claim 16 wherein said tetra functional epoxy resin is a tetra functional para-glycidyl amine.

18. A method for making a prepreg according to claim 14 wherein the molecular weight of said low molecular weight polyethersulfone is between 15,000 and 25,000 g/mole.

19. A method for making a composite part which includes the method for making a prepreg according to claim 14 and the additional step of curing said uncured thermoplastic-toughened epoxy resin to form said composite part.

20. A method for making a composite part according to claim 19 wherein said composite part forms at least part of a primary structure of an aircraft.

* * * * *